Patented Nov. 29, 1949

2,489,729

UNITED STATES PATENT OFFICE 2,489,729

CYANO-SUBSTITUTED TETRAHYDROPYRAN COMPOUNDS AND PREPARATION OF THE SAME

Curtis W. Smith, Berkeley, Calif., assignor to Shell Development Company, San Francisco, Calif., a corporation of Delaware No Drawing. Application July 8, 1948, Serial No. 37,516

13 Claims. (Cl. 260—333)

This invention relates to new and useful chemical compounds and to a method for their preparation. More particularly, the invention relates to tetrahydropyranyl alkyl ethers substituted in the heterocyclic nucleus by a cyano group, e. g., 6-cyano-2-isobutoxytetrahydropyran, and to a process for the preparation of the novel compounds of the invention.

An object of the invention is new and useful chemical compounds. Another object of the invention is to provide new and useful chemical compounds by reacting hydrogen cyanide with 2-(3,4-dihydro-1,2-pyranyl) ethers in the presence of a basic condensation catalyst. A further object is new and useful substituted tetrahydropyrans having attached to the heterocyclic nucleus both an alkoxy group and a cyano group, a particular object being such substituted tetrahydropyrans wherein the ether group and the cyano group are bonded to the carbon atoms in the Nos. 2 and 6 positions, respectively, of the heterocyclic ring. A more limited object of the invention is the preparation of new and valuable compounds by reacting 2-(3,4-dihydro-1,2-pyranyl) alkyl ethers with hydrogen cyanide, in a liquid phase and in the presence of pyridine. Other objects of the invention will become apparent hereinafter.

The foregoing and related objects of the invention have been accomplished by the new chemical compounds hereinafter described and claimed, and by a method for their preparation, also disclosed and claimed herein. The new compounds to which the invention relates are, broadly stated, monoheterocyclic substituted tetrahydropyrans. The compounds of the invention are characterized in that there is directly attached to the carbon atom in the No. 6 position of the heterocyclic ring, a cyano group, and in that there is directly linked to the carbon atom in the No. 2 position of the heterocyclic ring, an oxygen atom which in turn is directly linked to a hydrocarbon radical of one to eighteen carbon atoms. In the generic concepts of the invention other substituent groups or atoms may also be attached to carbon atoms of the tetrahydropyran ring; however, a preferred group of compounds consists of those in which the heterocyclic ring, if substituted by groups or atoms in addition to the aforesaid cyano group and oxygen atom which is linked to a hydrocarbon group of one to eighteen carbon atoms, is further substituted by lower alkyl groups, e. g., alkyl groups containing from one to eight carbon atoms. An especially valuable subgroup of compounds consists of those compounds of the invention in which the tetrahydropyran nucleus is disubstituted, i. e., substituted only by the aforesaid essential substituents.

Generically speaking, the extranuclear oxygen atom which is directly attached to the carbon atom in the No. 2 position of the heterocyclic ring may have its other valency satisfied by union with any suitable hydrocarbon radical containing from one to eighteen carbon atoms, such as an alkyl, an aryl, a cycloalkyl, an alkaryl, an aralkyl, or an unsaturated aliphatic hydrocarbon radical. Representative hydrocarbon radicals of from one to eighteen carbon atoms include, among others, methyl, ethyl, isopropyl, dodecyl, naphthyl, benzyl, stearyl, cyclohexyl, anthryl, bornyl, phenethyl, allyl, methallyl, cyclohexenyl, crotyl, camphanyl, pyrenyl, 1-isopentenyl, vinyl cyclohexadienyl, phenyl ethynyl, and isohexyl. A preferred sub-group of substituted tetrahydropyrans according to the invention are those in which the hydrocarbon group directly linked to said extranuclear oxygen atom is an alkyl group, such as a lower alkyl group, e. g., containing from one to eight carbon atoms.

The following are compounds that are illustrative of the invention: 2-isobutoxy-6-cyanotetrahydropyran, 2-methoxy-6-cyanotetrahydropyran, 2-isopropoxy-6-cyanotetrahydropyran, 2-isobutoxy-4-methyl-6-cyanotetrahydropyran, 2-pentoxy-5-methyl-6-cyanotetrahydropyran, 2-octadecyloxy-4-methyl-6-cyanotetrahydropyran, 2-methoxy-4-phenyl-6-cyanotetrahydropyran, 2-octyloxy-6-cyanotetrahydropyran, 2-ethoxy-4-methyl-6-cyanotetrahydropyran, 2-allyloxy-6-cyanotetrahydropyran, 2-ethoxy-6-methyl-6-cyanotetrahydropyran, 2-isopropoxy-4-ethyl-6-cyanotetrahydropyran, 2-hexoxy-6-cyanotetrahydropyran, 2-vinoxy-6-cyanotetrahydropyran, 2-phenoxy-6-cyanotetrahydropyran, 2-butoxy-4-methyl-6-cyanotetrahydropyran, and 2-octyloxy-4-phenyltetrahydropyran.

Because of the efficacy with which they may be prepared, and their especially desirable properties, a preferred subgeneric group of compounds may be represented by the formula

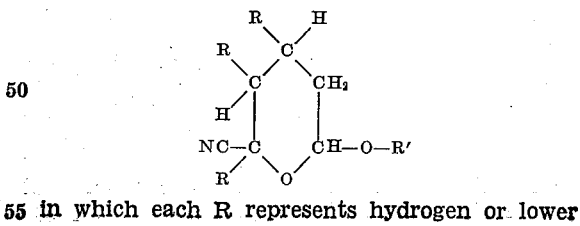

in which each R represents hydrogen or lower alkyl and R' represents a lower alkyl group. Especially valuable are the compounds according to the formula when R represents hydrogen only.

The novel cyano-substituted alkoxy-tetrahydropyrans of the invention may be prepared conveniently by reacting dihydropyranyl ethers having the nuclear olefinic bond in the 5,6 position, with hydrogen cyanide in the presence of a basic condensation catalyst, as in the illustrative specific equations:

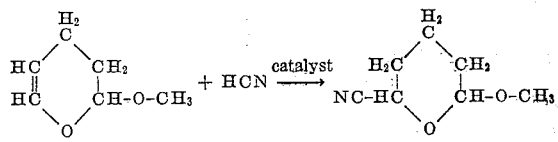

and

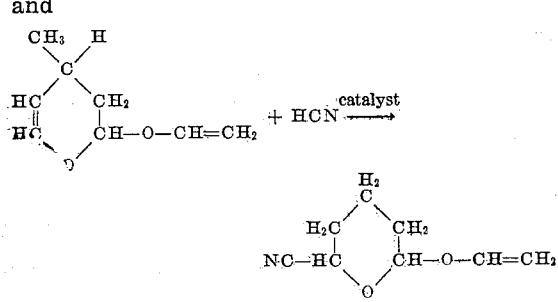

Suitable 2 - (3,4 - dihydro - 1,2 - pyranyl) alkyl ethers which may be employed as in the above equations for preparation of the present novel compounds, and a method for their preparation, are disclosed in the copending application of Smith, Norton, and Ballard, Serial No. 751,980, filed June 2, 1947. Reference is hereby made to said copending application for disclosure of a method for their preparation.

It is essential in accordance with the present invention to conduct the reaction between the dihydropyranyl ether and the hydrogen cyanide in the presence of a basic condensation catalyst. Basic condensation catalysts include broadly those compounds and materials which impart to water, when dissolved therein, a pH value greater than 7. Although any suitable basic condensation catalyst may be used, pyridine is a particularly efficacious catalyst for the reaction. Other basic condensation catalysts which may be employed include the alkali cyanides, such as NaCN and KCN, inorganic bases, such as KOH, NaOH, $Ca(OH)_2$, CaO, LiOH, $Ba(OH)_2$, inorganic basic salts, such as $Na_2CO_3$, $NaOOCCH_3$, $Na_3PO_4$, trisodium citrate, $CaCO_3$, Na ethylate, organic bases, such as primary, secondary, and tertiary amines and even quaternary ammonium bases, such as benzyl trimethyl ammonium hydroxide. An amount of the catalyst within the range of from about 0.2% to 50% of the weight of the reactants is employed, a preferred range being from about 1% to about 10% of the weight of the reactants.

The reaction proceeds to good yields of the desired product when the reactants are employed in substantially equimolar amounts. Larger or smaller relative amounts of hydrogen cyanide may be employed, however. Use of smaller proportions of HCN tends to reduce the efficiency of the process, while larger amounts, above say 3 moles per mole of the dihydropyranyl ether, tend to become uneconomic. A generally suitable range of proportions is mole ratios of HCN : dihydropyranyl ether from about 1:10 to about 20:1, a preferred range being from about 1:2 to about 3:1. The reaction is preferably conducted at moderately elevated temperatures. Temperatures from about +50° C. to about 250° C. are effective, a preferred range being from about 100° C. to about 200° C. The dihydropyranyl ether, the HCN, and the basic condensation catalyst may be mixed in suitable proportions, and the mixture heated as in an autoclave or other closed vessel to maintain the mixture in the liquid state. After a suitable time, generally from about ½ to 12 hours, the contents of the reaction vessel may be cooled and if desired fractionally distilled or otherwise treated to isolate the cyano-substituted alkoxytetrahydropyran. Isolation of the pure product, however, is optional, since it frequently may be possible in cases as where the product is to be used in further chemical syntheses, to utilize the crude reaction mixture without isolation of the product.

Dihydropyranyl ethers which may be reacted with HCN according to the invention to form novel and useful cyano-substituted 2-tetrahydropyranyl ethers include the following: 2-(3,4-dihydro-1,2-pyranyl) methyl ether, 2-(3,4-dihydro-1,2-pyranyl) ethyl ether, 2-(2-methyl-3,4-dihydro-1,2-pyranyl) methyl ether, 2-(6-methyl-3,4-dihydro-1,2-pyranyl) methyl ether, 2-(5-methyl-3,4-dihydro-1,2-pyranyl) isobutyl ether, 2-(5,6-dimethyl-3,4-dihydro-1,2-pyranyl) pentyl ether, 2-(3,4-dihydro-1,2-pyranyl) octyl ether, 2-(4-pentyl-3,4-dihydro-1,2-pyranyl) methyl ether, 2-(6-phenyl-3,4-dihydro-1,2-pyranyl) ethyl ether, 2-(3,4-dihydro-1,2-pyranyl) allyl ether, 2-(3,4-dihydro-1,2-pyranyl) vinyl ether, 2-(3,4-dihydro-1,2-pyranyl) phenyl ether, 2-(3,4-dihydro-1,2-pyranyl) naphthyl ether, and 2-(4-methyl-6-octyl-3,4-dihydro-1,2-pyranyl) phenyl ether.

The following examples will illustrate certain of the preferred embodiments of the invention without, however, being intended to limit the invention as it is defined in the hereto appended claims.

*Example I*

Equimolar amounts of 2-(3,4-dihydro-1,2-pyranyl) isobutyl ether and hydrogen cyanide were mixed, and to the mixture was added 1% by weight of pyridine. The total mixture was heated in a closed glass-lined reaction vessel at 150° C. for two hours. The mixture was then cooled and fractionally distilled. 2-isobutoxy-6-cyanotetrahydropyran was recovered in a 71% conversion of reactants to product as the fraction distilling at about 73° C. under 0.05–0.07 millimeter mercury pressure. The compound, after one redistillation, was found to have a refractive index ($n_D^{20}$) of about 1.4422 and a specific gravity (20°/4°) of about 0.979. Analyses for carbon and hydrogen were in good agreement with the theoretical values, as follows: per cent carbon, found 65.7%, calculated for $C_{10}H_{17}NO_2$, 65.5%; per cent hydrogen, found 9.4%, calculated, 9.4%.

*Example II*

When the reaction between equimolar amounts of HCN and 2-(3,4-dihydro-1,2-pyranyl) isobutyl ether was conducted in the presence of 2% of pyridine based on the total weight of reactants and at 150° C. for three hours, the conversion of reactants to product was increased to 82% of theory.

The novel compounds of the invention are of value as new and improved chemical intermediates. The position of the cyano group at a saturated carbon atom adjacent to the oxygen atom in the heterocyclic ring imparts unique and unforeseen properties to the products not possessed by cyano-substituted tetrahydropyrans in which the cyano group is bonded to a carbon atom other than one which is directly attached to the hetero oxygen atom. The presence at the other carbon atom which is directly united to the oxygen atom in the ring, also accounts for the improved properties of the products. Acids, esters, and amines may be prepared by hydrolysis, alcoholysis, and reduction, respectively, of the cyano group. Acyclic products may be prepared by treatment with hydrogen in the presence of a hydrogenation catalyst and water, with addition only of the elements of water. The products of the invention include compounds which are useful in themselves as special solvents and blending agents. The novel cyano-substituted alkoxy-tetrahydropyrans have desirable solubility characteristics, and may be employed, for example, in solvent-extraction procedures. They also include biologically active compounds and products useful for the synthesis of biologically active compounds.

I claim as my invention:

1. The substituted tetrahydropyran of the formula

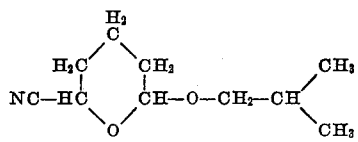

2. 6-cyano-2-alkoxytetrahydropyran.

3. A monoheterocyclic, substituted tetrahydropyran characterized in that there is a cyano group directly linked to the carbon atom in the No. 2 position of the heterocycle and additionally characterized in that there is the alkoxy group of a lower aliphatic monohydric alcohol directly linked to the carbon atom in the No. 2 position of the heterocycle.

4. As a new chemical compound, tetrahydropyran substituted in the No. 6 position by the cyano group and substituted in the No. 2 position by an oxygen atom which is directly linked by its other valency to a saturated hydrocarbon radical of from three to eight carbon atoms, said tetrahydropyran being otherwise unsubstituted.

5. As a new chemical compound, tetrahydropyran substituted in the No. 6 position by the cyano group and substituted in the No. 2 position by an oxygen atom which is directly linked by its other valency to a hydrocarbon radical of from one to eighteen carbon atoms, said tetrahydropyran being otherwise unsubstituted.

6. As a new chemical compound, a monoheterocyclic, substituted tetrahydropyran characterized in that there is a cyano group directly linked to the carbon atom in the No. 2 position of the heterocycle and additionally characterized in that there is directly linked to the carbon atom in the No. 2 position of the heterocycle an oxygen atom which in turn is directly attached to a hydrocarbon group of from one to eighteen carbon atoms.

7. A process for the preparation of 6-cyano-2-isobutoxytetrahydropyran which comprises reacting at a temperature within the range of from about 50° C. to about 250° C. 2-(3,4-dihydro-1,2-pyranyl) isobutyl ether with hydrogen cyanide in the presence of pyridine.

8. A process for the preparation of 6-cyano-2-isobutoxytetrahydropyran which comprises mixing 2-(3,4-dihydro-1,2-pyranyl) isobutyl ether and an about equimolar amount of hydrogen cyanide and heating the mixture in the liquid state in the presence of pyridine at about 150° C. for about 3 hours.

9. A process for the preparation of 6-cyano-2-isobutoxytetrahydropyran which comprises reacting at a temperature within the range of from about 50° C. to about 250° C. 2-(3,4-dihydro-1,2-pyranyl) isobutyl ether with hydrogen cyanide in a liquid phase in the presence of a basic condensation catalyst.

10. A process for the preparation of tetrahydropyran substituted in the No. 6 position by the cyano group and in the No. 2 position by an alkoxy group which comprises reacting a 2-dihydropyranyl alkyl ether having the nuclear olefinic bond in the 5,6-position of the nucleus with hydrogen cyanide in a liquid phase in the presence of pyridine at a temperature within the range of from about 100° C. to about 200° C.

11. A process for the preparation of tetrahydropyran substituted in the No. 6 position by the cyano group and in the No. 2 position by an alkoxy group which comprises reacting at a temperature within the range of from about 50° C. to about 250° C. a 2-dihydropyranyl alkyl ether with hydrogen cyanide in the presence of a basic condensation catalyst.

12. A process for the preparation of a cyano-substituted 2-tetrahydropyranyl organic ether by combining an organic oxy-ether of a 3,4-dihydro-1,2-pyran-2-ol with hydrogen cyanide which comprises heating hydrogen cyanide with an organic oxy-ether of a 3,4-dihydro-1,2-pyran-2-ol at a temperature within the range of from about 50° C. to about 250° C. in a liquid phase in the presence of pyridine.

13. A process for the preparation of a cyano-substituted 2-tetrahydropyranyl organic ether by combining an organic oxy-ether of a 3,4-dihydro-1,2-pyran-2-ol with hydrogen cyanide which comprises reacting hydrogen cyanide with an organic oxy-ether of a 3,4-dihydro-1,2-pyran-2-ol by heating a reaction mixture thereof in the presence of a basic condensation catalyst at a temperature within the range of from about 50° C. to about 250° C.

CURTIS W. SMITH.

No references cited.